Patented May 22, 1945

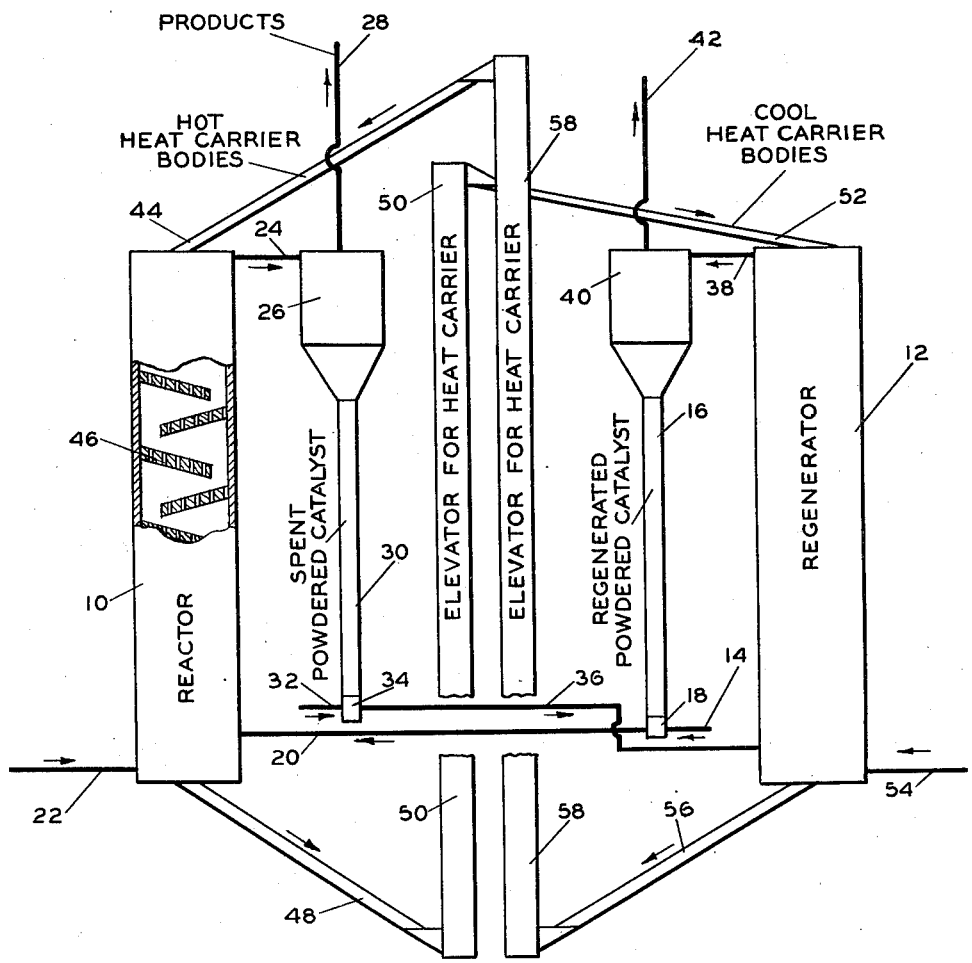

2,376,564

UNITED STATES PATENT OFFICE 2,376,564

CATALYTIC CONVERSION

John D. Upham and I. Louis Woik, Bartlesville, Okla., assignors to Phillips Petroleum Company, a corporation of Delaware Application January 1, 1944, Serial No. 516,614

5 Claims. (Cl. 196—52)

The present invention relates to conversion processes and apparatus therefor wherein a mobile catalyst is utilized. It is particularly applicable to the conversion of hydrocarbons using a powdered catalyst suspended in hydrocarbon vapors. The invention will be described with particular reference to catalytic cracking of gas oil or the like, but it is also applicable to other conversion reactions, such as hydroforming, dehydrogenation, cyclization, etc., especially endothermic conversions in which the catalyst is regenerated by the exothermic combustion of carbonaceous matter deposited thereon.

Inasmuch as cracking, dehydrogenation, etc., are endothermic reactions, the temperature of the hydrocarbon stream passing through a reaction zone generally decreases in the direction of flow, with consequent decrease in rate of reaction. In the catalyst regeneration step, the reverse occurs, that is the temperature of the regeneration gas increases in the direction of flow through the regeneration zone, with consequent overheating. Our invention serves to minimize these effects, with consequent improvement in efficiency.

The use of finely divided solid catalyst which is caused to flow through a conversion system has recently come into commercial use in the cracking or other treatment of hydrocarbon materials. In the so-called "fluid" cracking process, powdered solid cracking catalyst is suspended in hydrocarbon vapors in a cracking zone, withdrawn to a regeneration zone wherein carbon is burned off by suspension of the spent catalyst in hot oxygen-containing gases, and the regenerated catalyst then returned to the reaction zone for further use. In such processes, the catalyst is depended upon to a certain extent to act as heat carrier by transferring heat from the exothermic regeneration reaction to the endothermic cracking reaction which is generally carried out at a lower temperature. In order to effect transfer of a high percentage of the heat of regeneration to the conversion zone, a fairly high ratio of catalyst to regeneration gas and reactants is used, the amount of catalyst circulated frequently being in excess of that required for the sole purpose of catalyzing the conversion. Furthermore, the catalyst is liable to be subjected to undesirably high temperatures in the regeneration zone. Thus the excessive number of regenerations which the catalyst undergoes for a given amount of conversion, and the high temperature to which it is repeatedly subjected, serve to shorten the ultimate life of the catalyst, and force its discard as too permanently spent for further economic use after producing less product than would be the case under less severe operations.

An object of this invention is to provide improved methods and apparatus for carrying out catalyzed reactions. A further object is to provide for the utilization of heat generated in an exothermic reaction to supply heat to an endothermic reaction, utilizing direct heat exchange. Another object is to compensate for the temperature drop which normally occurs in an endothermic reaction zone. Another object is to effect endothermic hydrocarbon conversions in the presence of a mobile powdered catalyst, and to regenerate said catalyst by oxidation of carbon thereon, the while effecting transfer of heat from the regeneration to the conversion. A further object is to crack hydrocarbons by means of a so-called "fluid" catalyst while circulating a smaller amount of such catalyst than is normally used, and yet retaining advantages of the fluid-type catalyst. Still another object is to provide a means for at least partially stabilizing temperatures in the conversion and regeneration zones while effectively conserving heat. Other objects and advantages of the invention will be apparent from the accompanying disclosure and description.

Briefly, our invention accomplishes its objects by means of direct heat exchange in a novel and efficient manner, utilizing as a preferred embodiment mobile heat adsorptive and conductive bodies passed through the system in such a manner as to absorb heat and stabilize temperatures in a regeneration zone and to give up heat and likewise stabilize temperatures in a conversion zone, said bodies being in direct contact with gases carrying the powdered catalyst suspended therein. We preferably utilize heat retaining materials having better thermal properties than the catalyst, due particularly to higher thermal conductivity, as well as suitably high specific heat and/or density, the net effect being to provide better heat retaining and heat transfer properties than the catalyst used. Such materials are exemplified by silicon carbide ("Carborundum"), iron, aluminum, copper, steel, quartz, other forms of dense silica, fused aluminas of various types such as alundum, magnesite, etc. The heat retaining bodies are preferably inert under the conditions of use, and are preferably of a non-adsorptive nature.

In the preferred practice of this invention, finely divided solid catalyst is suspended in reactant vapors and conducted through a reaction zone at conversion temperatures and pressures. In the reaction zone, the suspension of catalyst in reactants is contacted with mobile heat retaining and conducting bodies. These bodies have absorbed a substantial amount of heat from the regeneration zone and are at a temperature above the conversion temperature. Preferably the suspension of catalyst in reactant vapors is passed upwardly counter-current to downwardly flowing heat retaining bodies of substantially larger particle size than the catalyst. Catalyst is separated from products of reaction and then, with or without intermediate purging as required, is suspended in an oxygen-containing gas in the regeneration zone at temperatures sufficiently high to effect combustion of the carbonaceous matter on said catalyst. Heat retentive material removed from the reaction zone is passed through the regeneration zone for the purpose of absorbing exothermic heat of combustion, preferably by counter-current flow to the suspension of catalyst in the regeneration gases. The heat so absorbed is transferred to the reaction zone by flow of the heat absorbant bodies from the regeneration zone to the reaction zone as described. In the regeneration zone the heat retaining material serves to stabilize the oxidation reaction by reason of the fact that absorption of heat by the heat retainers prevents peak temperatures from occurring. In a similar manner, excessive temperature drop is avoided in the conversion zone where the reaction in endothermic, since the heat retaining material supplies heat to the reaction. Only sufficient catalyst need be circulated to effect the desired extent of conversion.

The catalyst may be any suitable material for the particular reaction which can be utilized in finely divided form, say, of 200-400 mesh or even finer. Such catalysts as synthetic silica-alumina, bauxite, acid-treated clays such as "Super Filtrol," and the like are especially suited to catalytic cracking operations and may be readily utilized. Other catalysts suitable for cracking or other conversion reactions are well known to the art and need not be enumerated here.

The accompanying drawing shows somewhat diagrammatically, partly in elevation and partly in cut-away view, one advantageous arrangement of apparatus and flow of materials therethrough by which the principles of the invention may be applied to the catalytic cracking of gas oil. It will be appreciated that in view of the schematic nature of the drawing, numerous auxiliary items of equipment such as valves, pumps, compressors, heaters, fractionators, control equipment, etc., have been omitted. Such elements may be readily supplied by one skilled in the art and hence are not shown in order to avoid encumbrance of the drawing.

In the drawing, chambers 10 and 12 are provided, the former being for reaction and the latter for regeneration. While these chambers are shown of equal size, they may, of course, differ depending upon the particular reaction being catalyzed, the extent of carbon deposition on the catalyst, etc. Charge oil vapors are introduced to the sytem via line 14, and after picking up regenerated catalyst from standpipe 16 in injector or other means 18, are passed via line 20 into a low point of reactor 10. Additional reactants may be introduced through line 22 if desired. The suspension of powdered catalyst in reactant vapors passes upwardly through reaction chamber 10 wherein the gas oil is cracked to the desired extent and thence out via line 24 to cyclone separator 26 or the like. It is to be understood that a plurality of separators may be used as and if required. In separator 26 the spent catalyst is separated from the products, which are passed via line 28 to conventional fractionation means for recovery of products and of recycle streams. The separated catalyst passes into catalyst standpipe 30 wherein it may be purged and/or maintained in an aerated condition by conventional means not shown.

Air or other oxygen-containing regeneration gas enters the system through line 32 and picks up spent catalyst in unit 34. The resulting suspension passes via line 36 into regeneration chamber 12 at a low point therein. The suspension of spent catalyst in the oxygen-containing gases flows upwardly through chamber 12 wherein regeneration is effected by combustion of carbon on the catalyst. A suspension leaves the top of regenerator 12 through line 38 and passes to one or more cyclone separators 40 or the equivalent for separation of catalyst from gases. The spent regeneration gases exit via line 42, while the separated regenerated catalyst passes into standpipe 16 wherein it may be purged and/or aerated by conventional methods prior to reuse in reaction zone 10.

As the mixture of gases with catalyst flows through chamber 10, cracking or other endothermic reaction occurs. In order to diminish or obviate the loss of temperature which would normally occur, we introduce a hot heat carrier material, preferably in the from of granules, balls, or pellets, into the top of chamber 10 through line 44. This heat carrier material is at a temperature above the reaction temperature and thus imparts its heat to the reaction mixture by direct heat exchange. The heat carrier may have been heated in any desired manner, but in the embodiment illustrated in the drawing it has absorbed heat of regeneration in chamber 12. The pellets or the like are of particle size substantially greater than that of the powdered catalyst, so that they flow downwardly through the chamber. This effects a counter-current flow of heat carrier and reaction mixture, thus providing maximum heat at the outlet of the reaction zone where it is most needed, and a steadily decreasing amount of heat as it progresses toward the bottom of the reaction zone where the endothermic cracking is just started. The heat carrier particles may be of any suitable size to give the desired result, and will ordinarily fall within the range of from about 50 mesh up to say 1 inch in diameter. Ordinarily, particles having a diameter from about 0.1 to 0.3 inch are quite satisfactory. Chambers 10 and 12 may be provided with baffles 46, preferably perforated, to aid in contacting of heat retainer with the suspension of powdered catalyst in up-flowing gases and to provide a longer time of residence of the heat retainer and a more even rate of flow thereof by slowing its downward progress. Perforations in the baffles allow a relatively free upward flow therethrough and avoid any possibility of dead-space pockets in the chambers. Of course, other arrangements may be used to give similar results.

When the heat carrier granules drop below the point of inlet of powdered catalyst they may be effectively purged of any small amounts of powdered catalyst which may have become deposited thereon by a blast from line 22 of catalyst-free incoming charge vapors. However, although preferred, it is not absolutely required that all catalyst powder be thus removed, since the heat carrier next passes to the regeneration zone and any such residual powder is retained within the system. Line 22 may desirably be used for the introduction of steam or other inert purge gas to prevent the removal of any hydrocarbons with the heat carrier as well as to separate residual catalyst therefrom.

Heat carrier particles which have given up heat in passage through the reaction zone 10 are removed from the bottom thereof through line 48 and passed to elevator means 50, which desirably involves the use of a moving endless bucket-carrying chain. This equipment may be similar to that used currently in the so-called TCC system for carrying catalyst particles from one moving bed to another. The heat carrier is discharged from the top of elevator 50 and passes through line 52 to the top of regeneration zone 12. In this zone the heat carrier material is contacted with the suspension of powdered catalyst in regeneration gases in a manner similar to that just described for chamber 10. The carrier, cooled by its contact in chamber 10, now absorbs heat of regeneration in chamber 12, thus storing it up for use in chamber 10, and effectively controlling the highly exothermic regeneration by preventing localized hot spots and excessive temperature rises. If desired, the flow of heat retainer may be concurrent with the regeneration mixture in chamber 12, rather than counter-current as shown. The choice will depend largely upon the regeneration conditions, and it is preferred that the retainer leave the chamber at the end at which the highest temperature prevails. Additional regeneration gases, or purge gases, may be introduced through line 54 for contact with hot heat carrier before the latter exits from the bottom of chamber 12 via line 56 for the purpose of purging the heat carrier of residual gases and catalyst particles. Elevator 58 is utilized for carrying the hot particles to line 44 for admission to the top of reactor 10.

Various hydrocarbon feed stocks, such as naphthas, gas oils, and the like, may be cracked in accordance with the procedure described above. In general, cracking temperature in the range of 850–1150° F. may be used and a catalyst to oil ratio of from about 0.2 to 10 parts by weight of catalyst per weight of oil feed is satisfactory. Ordinarily, due to the use of the heat retaining bodies, a ratio of higher than 3 to 1 is seldom required and a ratio of 1 to 1 or less is frequently satisfactory. A contact time of 5 to 50 seconds in the conversion zone is usually suitable, depending on the temperature of operation, nature of catalyst, etc. The amount of regeneration gas used will depend to a large extent on the amount of carbon deposition occurring in the reaction zone. The oxygen content of the regeneration gas may range from about one per cent on up to that of air, and normally will be well in excess of that required for complete combustion of carbon on the catalyst being regenerated. Temperatures ranging from 1050 to 1250° F. are ordinarily attained in the regeneration zone.

It will be seen that the use of mobile heat retaining bodies in accordance with our invention makes possible a much more rapid regeneration than would otherwise be possible, since the bodies absorb a substantial amount of the heat of reaction; the very careful and difficult control of regeneration conditions characteristic of present methods is not so critical when operating thus, due to the stabilizing effect of the heat retaining bodies. The same types of advantages generally are found in the reaction zone, since by giving up a substantial portion of the heat required for cracking or other conversion the heat absorbent bodies minimize the normal drop of temperature in the reaction zone and thus greatly increase the rate of reaction. Furthermore, the countercurrent flow of heat carrier and reactants allows a much more uniform temperature to prevail thruout the reaction zone.

It will be understood that various conventional operations and/or equipment may be supplied by one skilled in the art as required without departing from the invention. Furthermore, although the invention has been described specifically with reference to the endothermic conversions of hydrocarbons, the principles thereof may readily be applied with suitable modifications to other conversions or chemical reactions.

We claim:

1. In the conversion of hydrocarbons wherein finely divided solid catalyst is passed through a circuit comprising a reaction zone wherein said catalyst is suspended in gaseous reactants for effecting said conversion and in a reactivation zone wherein said catalyst is suspended in hot oxygen-containing gases for burning carbonaceous material from said catalyst, the improvement which comprises introducing said suspended catalyst and a relatively inert mobile solid heat absorbent material of superior thermal properties and larger particle size than said catalyst into opposite ends of said conversion zone, withdrawing absorbent material and catalyst from ends of said conversion zone opposite their points of introduction, separating said catalyst from the effluent, separately introducing said catalyst and absorbent material into opposite ends of said regeneration zone, withdrawing heated absorbent material and regenerated catalyst from ends of regeneration zone opposite their points of introduction, and recycling each to said conversion zone.

2. In the endothermic catalytic cracking of hydrocarbons in which cracking catalyst having a particle size substantially within the range of about 200 to 400 mesh is contacted with hydrocarbon vapor in a reaction zone and then with oxygen-containing gases in an exothermic regeneration zone at a higher temperature, the method of transferring heat from the regeneration zone to the reaction zone which comprises flowing downwardly in said regeneration zone through up-flowing regeneration gases and suspended catalyst being regenerated at a temperature of about 1050–1250° F. a heat absorbent solid having a higher heat capacity than said catalyst and having a particle size substantially within the range of about 0.1 to 0.3 inch in diameter whereby a portion of liberated heat is absorbed thereby, separating regenerated catalyst from regenerating gases and recovering hot heat absorbent material from the bottom of the regeneration zone, suspending said regenerated catalyst in the hydrocarbon vapors, and passing the resulting suspension through said reaction zone at a temperature of about 850–1150° F. in countercurrent contact with down-flowing heated absorbent material removed from the bottom of said regeneration zone.

3. The process of claim 2 in which said catalyst is separated from the effluent from reaction zone and is suspended in up-flowing oxygen-containing regenerating gases in said regeneration zone in counter-current contact with heat absorbent material removed from bottom of said reaction zone for downward flow in the regeneration zone as described.

4. The process of claim 2 in which the heat absorbent particles are purged of residual catalyst and gases prior to passage to another zone.

5. In the endothermic conversion of hydrocarbons wherein finely divided solid catalyst is passed through a circuit comprising a reaction zone wherein said catalyst is suspended in gaseous reactants for effecting said conversion and wherein a temperature drop normally tends to occur in the direction of flow of reactants due to the endothermic nature of the reaction, and a reactivation zone wherein said catalyst is suspended in hot oxygen-containing regeneration gases for the combustion of carbonaceous deposits thereon and wherein a rise in temperature tends to occur in the direction of flow of regeneration gases due to the exothermic nature of the reaction, the method for compensating for said endothermic temperature drop and said exothermic temperature rise, respectively, which comprises introducing relatively cool particles of a heat retaining material having a higher heat capacity than said catalyst into the reactivation zone and flowing same countercurrent to the flow of said catalyst suspended in the regeneration gases whereby a substantial proportion of the liberated heat will be absorbed by said heat retaining material, separating said regenerated catalyst and the hot heat retaining material at opposite ends of said reactivation zone, suspending said regenerated catalyst in reactants and flowing said suspension through said reaction zone, introducing said hot heat retaining material into the reaction zone at the opposite end thereof and flowing same countercurrent to said catalyst suspension whereby a substantial proportion of the heat absorbed in said heat retaining material will be imparted to the reaction zone in the region where the greatest temperature drop occurs, recovering the thus-cooled heat retaining material and the spent catalyst from opposite ends of the reaction zone, and returning said catalyst and said heat retaining material to said reactivation zone.

JOHN D. UPHAM.
I. LOUIS WOLK.